J. A. HAY.
ELECTRIC FURNACE.
APPLICATION FILED JUNE 19, 1909.
932,469.
Patented Aug. 31, 1909.
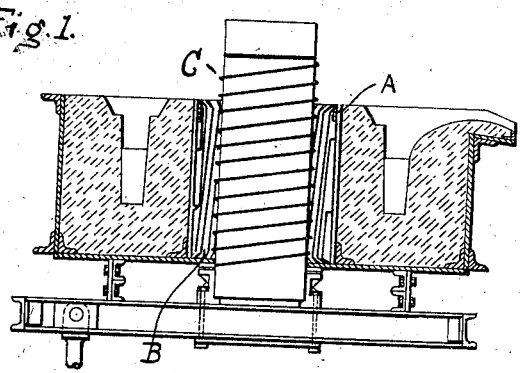
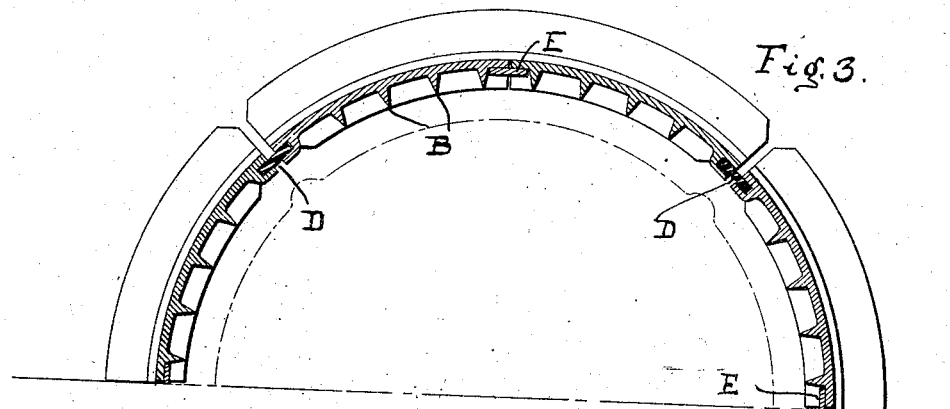
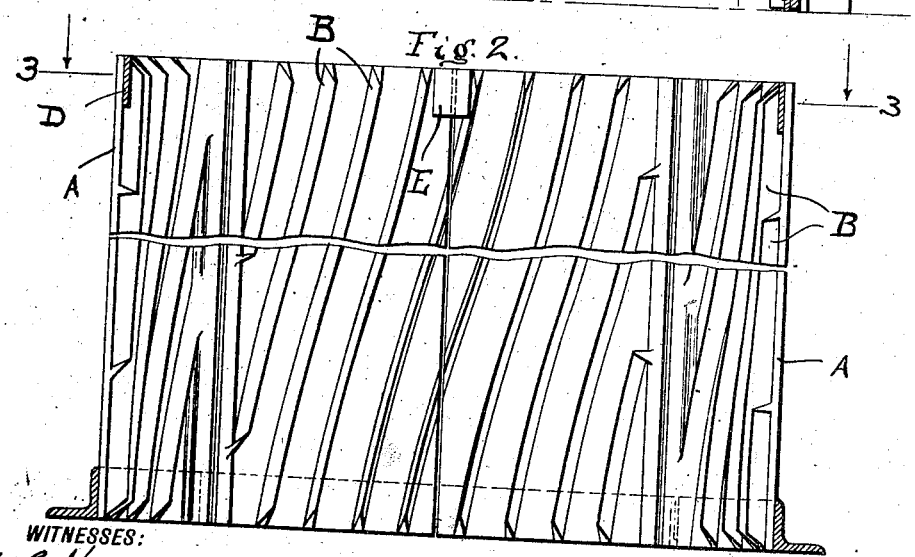
WITNESSES:
INVENTOR
JOHN ALEXANDER HAY
BY
Howson and Howson
ATTORNEYS

UNITED STATES PATENT OFFICE.

JOHN A. HAY, OF LONDON, ENGLAND, ASSIGNOR TO AMERICAN ELECTRIC FURNACE COMPANY, OF NEW YORK, N. Y., A CORPORATION OF NEW YORK.

ELECTRIC FURNACE.

932,469.  Specification of Letters Patent.  Patented Aug. 31, 1909.

Application filed June 19, 1909. Serial No. 503,225.

*To all whom it may concern:*

Be it known that I, JOHN A. HAY, a subject of the King of Great Britain and Ireland, and residing at London, England, have invented a certain new and useful Improvement in Electric Furnaces, of which the following is a specification.

My invention relates to electric furnaces and particularly to electric furnaces of the induction type, the object of my invention being to provide improved means for cooling the primary or other winding surrounding the core.

In the accompanying drawings, Figure 1 is a cross section of a furnace to which my invention is applied; Fig. 2 is a vertical section of the metallic shield drawn to a larger scale, and Fig. 3 is a section on the line 3—3, Fig. 2.

In induction furnaces the vertical limb or limbs of the core with its primary or other coils ordinarily pierce the furnace and the coils are thus liable to be subjected to the injurious heat conducted through the walls of the crucible, or hearth. Various devices such as water jackets, asbestos linings and the like have been resorted to in order to protect the coils from injury by this heat with more or less satisfactory results. A system of metallic shields through which is passed a current of air has also been employed.

As a simple and yet efficient expedient I now propose to increase the radiating surface of the usual metallic shield A which lines the vertical passage through the furnace in which the limb or limbs of the transformer and coils C are located, so that an air current flowing through this passage will carry off the heat of the metallic shield A more readily and therefore maintain the limb or limbs of the transformer and coils relatively cool. While this increased radiation surface may be obtained in various ways, I prefer to secure it by forming thin ribs B extending from top to bottom of the metallic shield. Were the ribs carried merely straight from top to bottom, the radiating surface of the metallic shield could be readily doubled. But I propose to obtain a still further increase by making the ribs of greater length than the axial diameter of the metallic plate A. In the example shown this is accomplished by forming the ribs spirally on the metallic shield, since the least opposition to the flow of the air current is thus obtained. These spirally placed ribs also materially increase the strength of the metallic shield.

The heat from the crucible is sufficient in and of itself to create an upward draft through the passage inclosed by the lining, and this in most cases is sufficient to keep the metallic shield A cooled, but this may be supplemented by a forced draft, if desired.

For convenience of manufacture and to facilitate the shaping of the lining to any form of passage, the shield A may be made in sections as shown, two or more sections being joined by rivet plates E, and the divisions thus formed being united by dowel plates D of insulating material.

Obviously my invention may be embodied in other forms of construction and I do not limit myself to the precise structure shown, but

I claim as my invention—

1. In an electric furnace having a passage through the crucible or hearth for limbs of the core and a winding of the type described, a metallic shield for said passage having a radiation surface of materially greater area than the normal surface area of the passage.

2. In an electric furnace having a passage through the crucible or hearth for the limbs of the core and windings of the type described, a metallic shield for said passage having ribs formed thereon to increase the radiation surface of said metallic shield.

3. In an electric furnace having a passage through the crucible or hearth for the limbs of the core and windings of the type described, a metallic shield for said passage having ribs of greater length than the axial diameter of said metallic shield.

In testimony whereof I have signed my name to this specification, in the presence of two subscribing witnesses.

JOHN A. HAY.

Witnesses:
 ADOLPH E. GUTGSELL,
 WILLIAM ABBE.